INVENTORS:
Edward L. Amonette
George W. Rodgers

INVENTORS:
Edward L. Amonette
George W. Rodgers

United States Patent Office 2,818,726
Patented Jan. 7, 1958

2,818,726

AUTOMATIC CALIBRATING SYSTEM FOR PRESSURE TRANSDUCERS

Edward L. Amonette and George W. Rodgers, Albuquerque, N. Mex., assignors, by mesne assignments, to the United States of America as represented by the United States Atomic Energy Commission Application October 17, 1955, Serial No. 541,103

3 Claims. (Cl. 73—4)

This invention relates to automatic systems for correlating fluid pressure with the electrical or electrically observed outputs of pressure-measuring transducers.

There is a large family of pressure transducers, all of which have an element such as a diaphragm which moves with pressure changes, and which is mechanically linked to an electrical switch or to variable resistive, inductive or capacitive elements. In this manner an electrical signal is created in response to a change in pressure. In order for an observer to read the signal in terms of pressure he must know the calibration of the instrument in terms of pressure versus signal.

In the prior art of calibrating, an operator reads a mercurial manometer when the transducer initiates audible or visual signals at discrete points within its range of pressure, as the pressure is varied. Since the difficulty of reading the instantaneous position of a moving mercury column increases with its speed, the practice has been to change the pressure very slowly, making the calibration process a long and slow one. Added to the disadvantage of slowness are the inaccuracies of human reaction time and human reading error plus the fact that, even with the aid of magnifying glasses, there is a limit to the precision with which a scale may be read by the human eye.

The general object of this invention is to calibrate pressure transducers much more quickly and accurately and with considerably less operator fatigue than is done in the prior art.

It is not uncommon that the accuracy of a transducer will vary with the rate of change of pressure. Therefore it is desirable that the transducer be calibrated at the same rate of change of pressure as is expected to occur at the time of use. The prior art is deficient in this respect, since the calibration speed is severely limited by human reading ability.

A more specific object of this invention is to provide means for calibrating pressure transducers at a rate of change of pressure more nearly that expected during use of the instruments than has been possible heretofore.

Some applications of pressure transducers require that the calibrations be recorded on punched cards. In the prior art this is an operation separate from that of calibration, wherein an operator reads the calibration as written by the calibrating operator and operates a card-punching machine to obtain a punched card for each calibration point.

Another object of this invention is to provide means for automatically punching calibration information on a card for each calibration point at the time of calibration.

The preferred embodiment of the invention makes use of a mercurial manometer to measure the air pressure applied to the transducer. A servo system follows the top of the mercury column as the pressure is changed and operates an analog-to-digital converter. This converter furnishes electrical pulses, each representing an increment of pressure change, to a reversible counter. The transducer furnishes a signal at each calibration point, causing an electric typewriter and a card-punch machine to record the pressure at that instant as indicated by the counter. Another counter keeps track of the calibration points so that a number identifying each point is recorded with the corresponding pressure. A special relay control system controls the pressure trend and programs the sequential calibration of several transducers.

These and other features of the invention will be better understood by reading the description to follow and by examining the drawings, in which.

Figure 1:
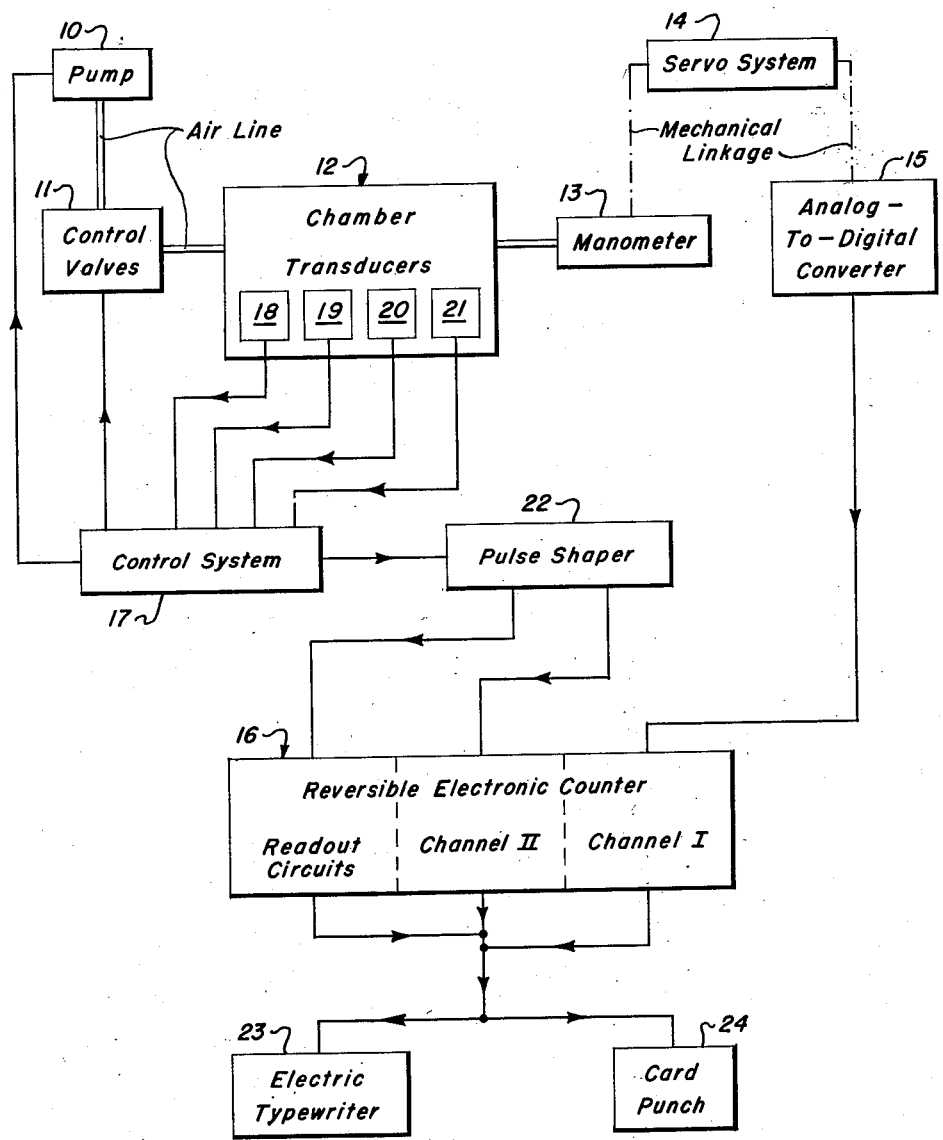
Figure 1 is a block diagram of the preferred embodiment of the invention.

Referring now to Fig. 1: Pump 10 furnishes either pressure or vacuum through control valves 11 to chamber 12. Manometer 13 measures the absolute pressure within the chamber; servo system 14 and analog-to-digital converter 15 transmit the measurement to channel I of reversible electronic counter 16 for storage. Control system 17 contains switches and relays necessary to the cooperative functioning of the aforementioned components. One such relay connects the output terminals of one of transducers 18, 19, 20, 21, which are within chamber 12, to pulse shaper 22. The transducer output pulses, suitably shaped, are sent to the readout circuits and channel II of counter 16. The readout circuits, when pulsed, cause the accumulated totals in channel I and channel II to be recorded by electric typewriter 23 and card punch 24.

Figure 2:
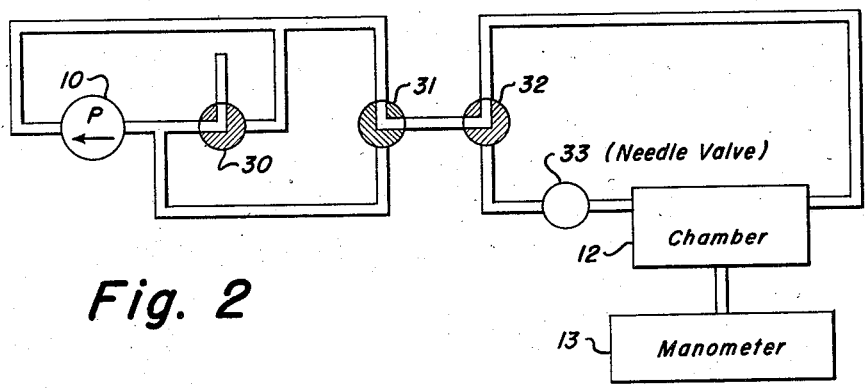
Figure 2 is a block diagram of the air pressure system.

From Fig. 2 it is seen that valves 30 and 31, operating together, transmit increasing or decreasing pressure to valves 32 and 33 from unidirectional pump 10. Valve 30 vents the appropriate side of the pump to the atmosphere while valve 31 connects the opposite side of the pump to valve 32. Valve 33 is a hand-controlled needle valve which provides very close control of the pressure within chamber 12, which is measured by manometer 13. At times when only the maximum rate of change of pressure is desired, valve 32 is operated to the position shown, bypassing valve 33. Valves 30, 31, and 32 are solenoid valves wherein an orifice is connected to either of two other orifices according to whether an electrical solenoid is energized or not. Obviously, substitution of a reversible pump for unidirectional pump 10 would eliminate the need for valves 30 and 31. Figure 2 shows no electrical connections. It will be obvious to one skilled in the art how connections shall be made to the control circuits of Fig. 4 to insure the operation described.

Figure 3:
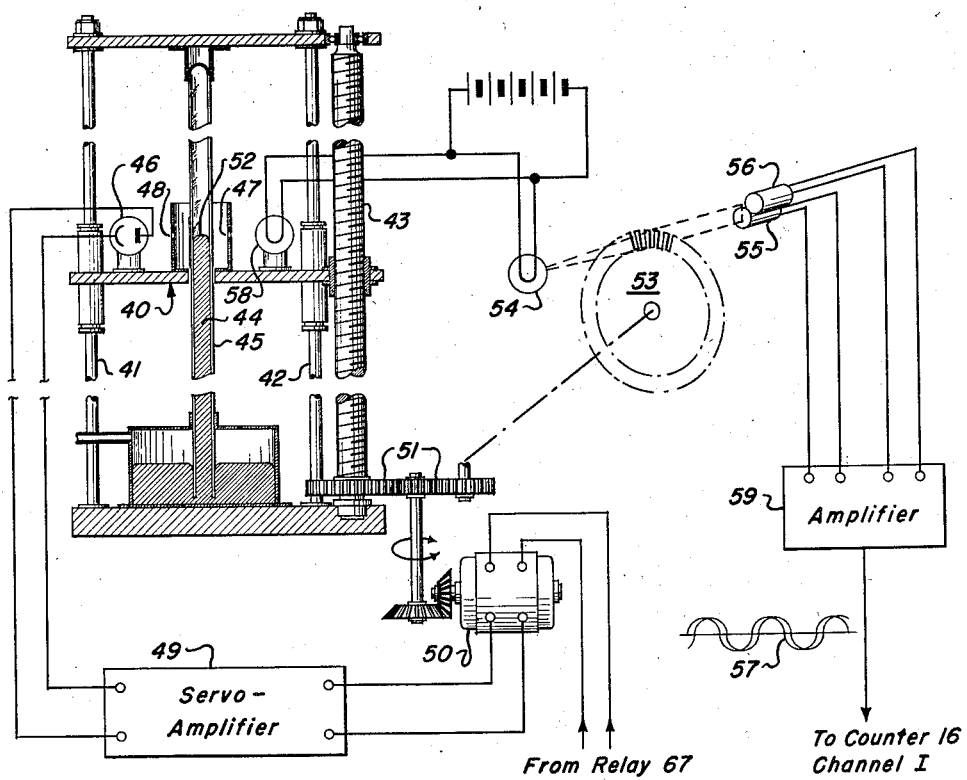
Figure 3 shows the manometer servo system and the analog-to-digital converter.

Figure 3 shows the means for converting the height of the manometer mercury column into an electrical signal. Scanner 40 rides vertically along supporting members 41 and 42 and is driven by lead screw 43. Vertical mercury column 44 is supported by transparent tube 45. Mounted on scanner 40 on opposite sides of tube 45 are light source 58 and photocell 46 which act together in the following manner to control the position of the scanner: when the scanner is located above mercury column 44 light source 58 transmits light through slits 47 and 48 to photocell 46. The resultant signal generated within the photocell is amplified by conventional servoamplifier 49 and causes servomotor 50 to turn, providing voltage is supplied to its field winding by relay 67. Gears 51 transmit the motion to lead screw 43 in a direction to bring scanner 40 down towards the mercury.

When the scanner reaches the point where the mercury blocks the flow of light from light source 58 to photocell 46, the action is reversed and the scanner is driven upward. In this way the scanner reaches a balance position where meniscus 52 allows about half the light passing through slit 47 to continue through slit 48 to photocell 46. Once this position is reached, the quickness of response of servoamplifier 49 and servomotor 50 causes scanner 40 to follow very closely the rise and fall of mercury column 44.

Servomotor 50, through gears 51, turns slotted disk 53, which is mounted between light source 54 and photocells 55 and 56. The photocells are so mounted that any light beam shining through a slot of disk 53 as the disk turns strikes first one photocell, then the other. The resultant phase difference between the electrical signals 57 generated in the separate photocells and amplified by amplifier 59 is used, by means of suitable circuitry within counter 16 (Fig. 1), to determine the direction of rotation of slotted disk 53.

Each signal is seen to be similar to a sine wave in which each cycle represents a rotation of disk 53 from one slot to the next coincident with an incremental change in pressure. Channel I of the counter counts the cycles and stores the count as a measure of pressure. When the direction of rotation changes with a reversal of pressure trend, the photocell signals reverse their phase relationship so that what was the leading signal is now lagging and channel I subtracts from the storage. In order that the storage will always register the pressure being measured, it is necessary that the operator, before calibration, determine the height of the mercury column and set that figure into channel I. This gives the counter a correct starting figure from which subtractions, or to which additions, are made as the pressure decreases or increases respectively. Reference is made to U. S. Patent No. 2,685,082, issued to W. W. Beman, et al., July 27, 1954 for a more complete description of the combination of slotted disk 53, light source 54 and photocells 55 and 56.

Figure 4:
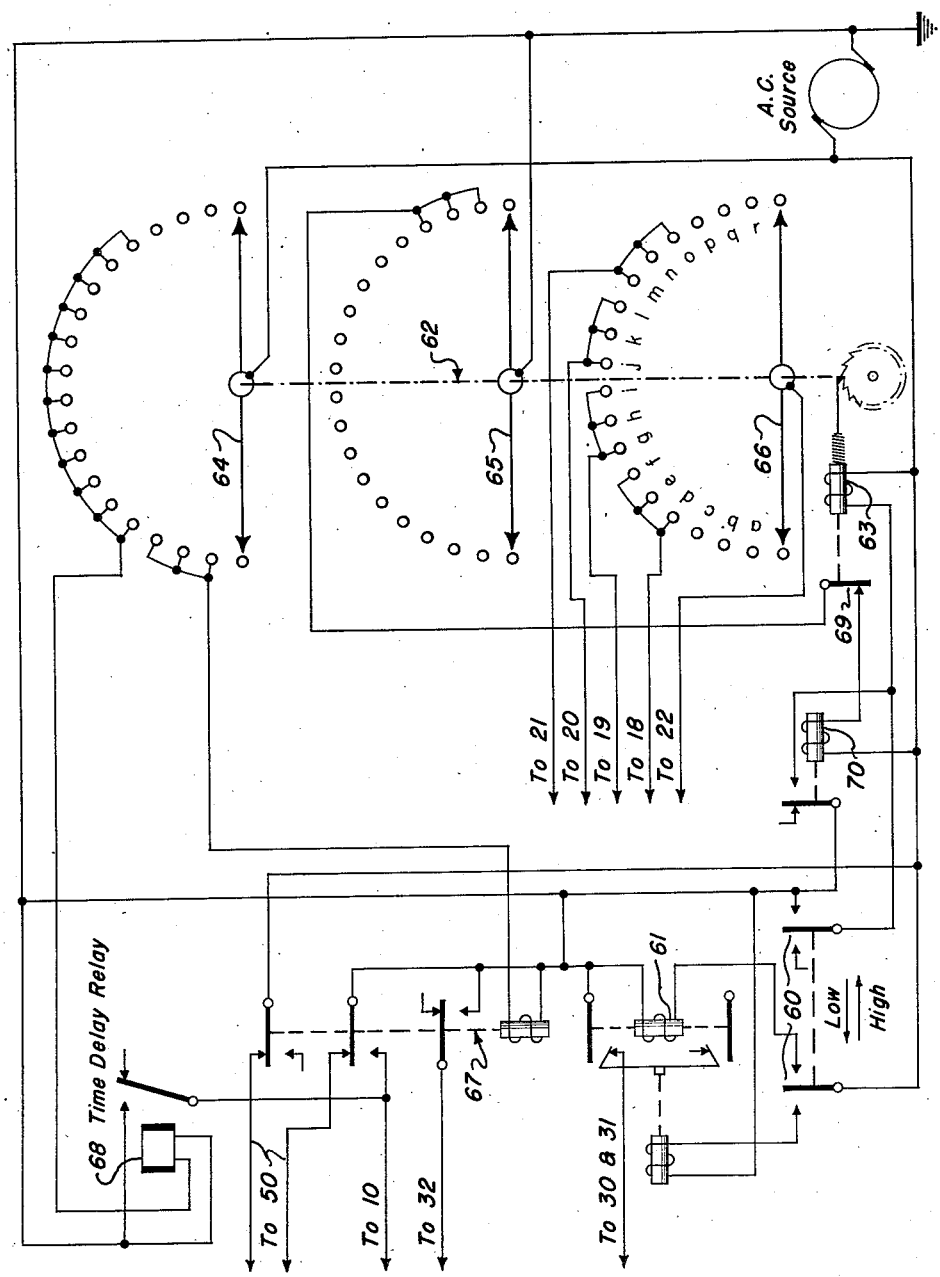
Figure 4 shows the control system.

The control system diagrammed in Fig. 4 ties together the components of the calibrating system, insuring their correct sequence of operation. The performance of the system is best understood by following the succession of operations which occur during normal use, starting with all relays in the positions shown.

To start a calibration the operator closes switch 60 in the "high" position, latching relay 61 and energizing solenoid 63 of stepping relay 62. The closed contacts of relay 61 apply A. C. power to the solenoids of valves 30 and 31, causing the valves to assume the positions whereby pump 10 is connected to apply vacuum to the remainder of the air system. Stepping relay 62 is the type commonly referred to as spring-driven. This means that solenoid 63 operates a mechanism to compress a driving spring which is released when solenoid 63 is de-energized by the operator's reopening of switch 60. The energy stored in the spring is used to advance wipers 64, 65 and 66 one position, in this case to position $a$.

Wiper 64 is wired directly to the ungrounded side of a single-phase alternating-current source. Wiper 65 is wired to the grounded side of the same source. Wiper 66 connects directly to the input of pulse shaper 22. With all three wipers in position $a$, only wiper 64 performs a function, namely that of completing the circuit to operate relay 67, which has three sets of contacts. When the relay operates, these contacts (1) disable servomotor 50 by removing the voltage from the field winding, (2) start pump 10 by completing the voltage circuit (not shown) to the pump motor, and (3) operate valve 32 by completing the voltage circuit to its solenoid. This places the calibrating system in the condition where the pump applies full vacuum to the chamber and the manometer, but the scanner does not follow the falling mercury column.

When the pressure reaches a lower limit prescribed for the calibration, the operator momentarily closes switch 60 in the "low" position, thus unlatching relay 61 and returning valves 30 and 31 to their starting positions. This action reverses the pressure trend to that of increasing pressure. When the high-pressure limit is reached, the operator again momentarily closes switch 60, this time in the "high" position, again reversing the pressure trend and stepping the wipers of relay 62 to position $b$.

Wipers 64, 65 and 66 are the shorting type, that is, when stepped to the new position each touches the next contact before breaking with the preceding one. Thus, during the course of the calibration, as wiper 64 passes from contact $a$ to $b$ to $c$, all of which are connected together, voltage is continuously applied to relay 67. In this way the transducers are subjected to three fast cycles of pressure change for the purpose of exercising their pressure diaphragms before actual calibration.

On the fourth operation of switch 60 to the "high" position, wiper 64 removes the voltage from relay 67 whose contacts then (1) energize the field winding of servomotor 50 so that the manometer scanner seeks the mercury meniscus, (2) stop pump 10, and (3) de-energize the solenoid of valve 32 so that valve 33 is no longer bypassed. The same wiper then applies voltage to relay 68, which is a time-delay relay. It is set to delay closing its contacts until the manometer scanner has had time to balance at the meniscus. Then the contact closure starts the pump, initiating a trend of decreasing pressure whose rate is controlled by the setting of valve 33. The contacts of relay 68 remain closed for the remainder of the calibration.

Wiper 66, stepped to position $d$ in coincidence with wipers 64 and 65, connects the electrical output of transducer 18 to pulse shaper 22. The bank of contacts traversed by wiper 66 is wired so that each transducer is connected in turn for calibration during three consecutive pressure cycles each. Obviously the wiring may be changed to accommodate a different number of transducers from that shown, or to allow calibration of each for a different number of cycles.

After the last transducer has been calibrated the wipers are stepped to position $p$. Then wiper 65, in conjunction with breaker contacts 69 and relay 70, initiates a homing action which automatically steps all wipers past the remaining contacts to the starting position shown. This homing action, relying upon contacts 69 opening each time coil 63 is energized, is well known to those skilled in the art and will not be explained further.

Figure 5:
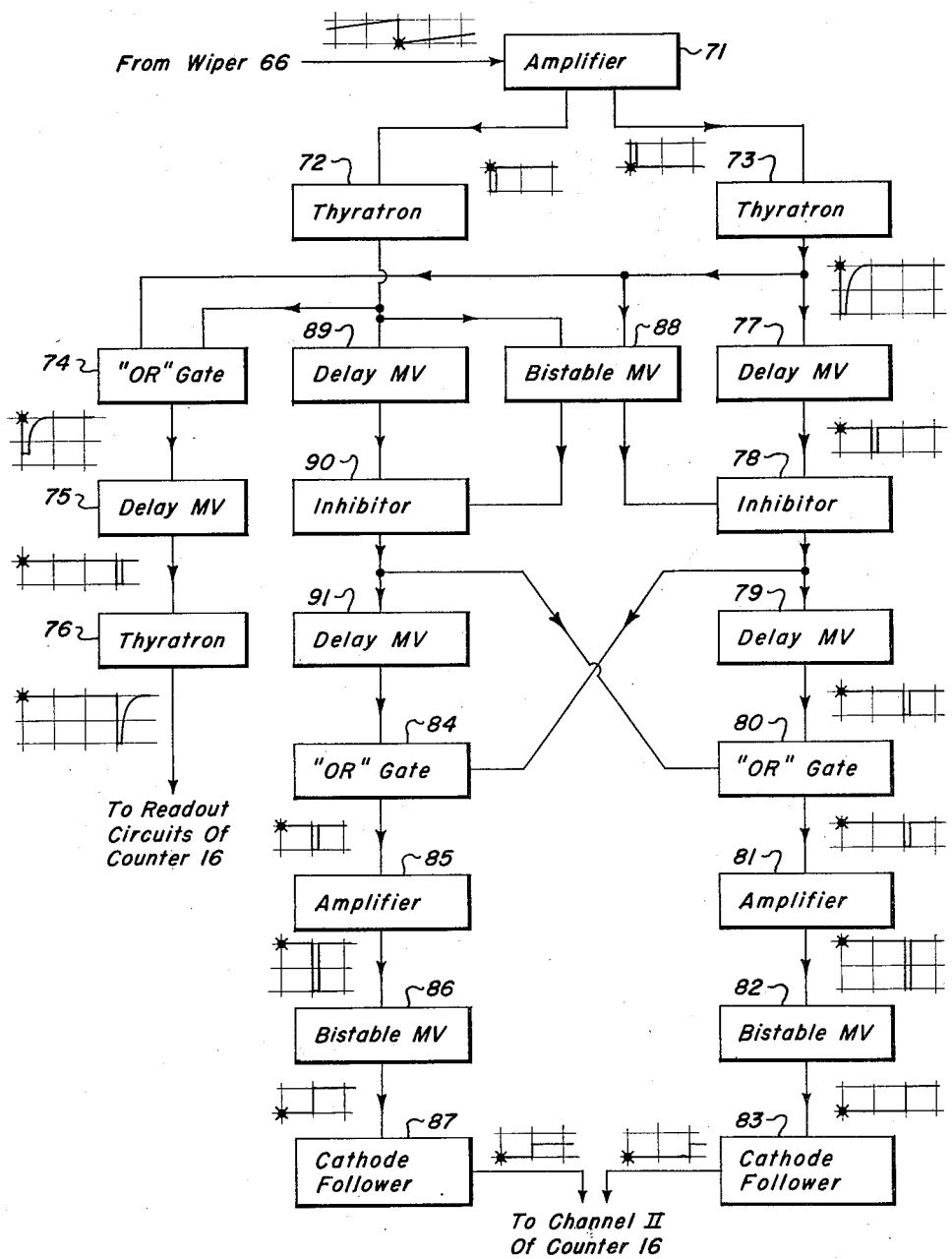
Figure 5 is a block diagram of the pulse shaper, an electronic circuit for shaping and timing the transducer signal before it is sent to the counter and the recording means.

It is the purpose of pulse shaper 22, which is shown as a detailed block diagram in Fig. 5, to convert the electrical signal emitted by the transducer being calibrated into two signals compatible with the electronic counter. The first of these, the readout signal, commands the readout circuits of the counter to initiate recording of the totals accumulated in channels I and II. The second signal is a serial count of calibration points and is accumulated in channel II.

Figure 5 is described in connection with a pressure transducer known as the segmented potentiometer type, although it will be apparent that the invention is not limited to use with this type of transducer. This transducer comprises a segmented resistance winding each of whose segments linearly changes in resistance between the same limits with length, and a wiper which traverses the winding when urged by a pressure-actuated diaphragm. The segments are connected so that the resistance measured at the output terminals varies in a sawtooth manner with changing pressure, slowly changing from one resistance limit to the other then quickly returning to the first.

Amplifier 71 is actually two conventional triode amplifiers joined by the resistance winding of the transducer. The winding is common to the cathode circuit of one triode and the grid circuit of the other so that two pulses of opposite polarity are derived when the transducer wiper passes over a boundary between segments and causes a sharp change in transducer output resistance.

Thyratrons 72 and 73 are identically set up to fire when a positive trigger pulse arrives from amplifier 71, so that only the one receiving the positive pulse will fire at any given sawtooth. Further, reversal of the pressure trend will invert the sawtooth resistance characteristic so the polarity of trigger pulses arriving at the thyratrons will be reversed.

Assuming decreasing pressure, a series of sawtooth changes in resistance like that shown in Fig. 5 are connected to amplifier 71 by wiper 66. The sudden drop in resistance at the end of each sawtooth causes amplifier 71 to generate a negative pulse, conducted to thyratron 72, and a positive pulse, which fires thyratron 73. "Or" gate 74 will transmit output pulses from either thyratron 72 or 73, hence its name, so in this instance the negative pulse from thyratron 73 goes through the gate and triggers delay multivibrator 75. The delayed pulse triggers thyratron 76 and the thyratron pulse actuates the readout circuits of counter 16.

The pulse from thyratron 73 also follows another path: First delayed by delay multivibrator 77, the pulse passes through inhibitor 78 and takes two similar paths, differing only by the delay imparted by delay multivibrator 79. In the delayed path the delayed pulse from multivibrator 79 passes through "or" gate 80, is amplified by amplifier 81 and triggers bistable multivibrator 82. The resultant change in voltage level of the multibrator output is coupled by cathode follower 83 to channel II of counter 16.

The direct path followed by the pulse from inhibitor 78 is through "or" gate 84, amplifier 85, bistable multivibrator 86 and cathode follower 87. It is seen that the resultant change in voltage level arrives at the second line to channel II earlier than the similar change on the first line. This time relationship causes a count to be added by channel II of counter 16 rather than subtracted. Thus while pressure is decreasing each readout is numbered as one more than the preceding one. It will be noted from examination of the representative waveforms in Fig. 5 that the readout pulse is delayed enough that the corresponding count is added to channel II before readout.

When the pressure trend is reversed the transducer wiper starts back over the segments just traversed. It is desirable that the readout at each segment boundary be identified by the same serial number that it was given when the pressure was decreasing. Therefore it is necessary that no count be subtracted from the storage in channel II at the first readout after reversal. In that way the two successive readouts, the last before reversal and the first after, retained the same number, identifying them with the same segment boundary.

Referring again to Fig. 5 and assuming the pressure trend has reversed and is now increasing, wiper 66 connects a series of sawtooth changes in resistance, inverted from the waveform shown, to amplifier 71. The waveforms occurring at each element in the action to follow are omitted from Fig. 5 but their similarity to the pictured waveforms will be readily apparent. When the transducer wiper recrosses the first segment boundary after reversal, amplifier 71 emits a negative pulse to thyratron 73 and a positive pulse to thyratron 72, which triggers the latter. The strong negative pulse from thyratron 72 triggers bistable multivibrator 88 to a new state and the sudden rise in the voltage of the appropriate plate of the multivibrator tube is conducted to inhibitor 90 where it inhibits the coincident pulse arriving from delay multivibrator 89. Thus inhibited, the pulse is prohibited from progressing further through the circuitry and no signal is received by channel II of counter 16.

The pulse from thyratron 72 also goes through "or" gate 74 to delay multivibrator 75. The delayed pulse triggers thyratron 76, whose output pulse, conducted to the readout circuits of counter 16, causes a readout.

Succeeding sawtooth changes in resistance do not cause bistable multivibrator 88 to emit inhibiting pulses so a pair of pulses is sent to channel II in each case. Since the pressure is increasing, thyratron 72 is the main pulse source and the signal progresses through delay multivibrator 89 and inhibitor 90 before branching to follow an undelayed path through elements 80, 81, 82, and 83, and a delayed path through elements 91, 84, 85, 86 and 87. Hence, the output signal of cathode follower 83 leads the corresponding output of cathode follower 87, causing a count to be subtracted from the total in channel II of counter 16. Each readout is then identified with the particular segment boundary by the same serial number as was given that boundary when pressure was decreasing.

Although the readout identification feature just described is a convenient way of eliminating confusion between pressure readings pertaining to different readouts, occasionally the elapsed pressure between readouts for a particular type of transducer is sufficient to reduce the confusion to an allowable degree. In such cases channel II of counter 16 and a large part of pulse shaper 22 could be eliminated with no great loss.

Reversible electronic counter 16 is not shown in detail in any diagram. For a complete description of the counter and its operation with electric typewriter 23 and card punch 24, see the Instruction Manual for Telecordex, type 8A, which can be obtained from the Telecomputing Corporation, Burbank, California. It is sufficient here to say that an entry is made by the typewriter and a card is punched by the card punch when each readout pulse is received by the counter. Identifying data such as the serial number of the transducer, the date of calibration, etc., can also be recorded at the same time. If desired, either the typewriter or the card punch can be used singly rather than in combination.

During calibration the maximum rate of change of pressure is limited to that which the mercury column will accurately follow. Nevertheless, a considerable increase is obtainable over the maximum rate in the prior art and the hand-controlled needle valve makes it possible for the operator to calibrate at any rate up to the maximum.

It will be recognized by those skilled in the art that the foregoing description, together with the accompanying drawings, is an explanation only of a preferred embodiment of the invention. Departures from the preferred embodiment by way of substitution of equivalent components may be made without leaving the sphere and scope of the invention as claimed below.

We claim as our invention:

1. The system for calibrating electromechanical pressure transducers comprising means for applying variable absolute pressure to at least one transducer; a mercurial manometer for measuring the pressure, having a servo-controlled scanner for following the top of the mercury column; an analog-to-digital converter mechanically coupled to the scanner and capable of representing an incremental change in pressure, as evidenced by a change in the position of the scanner, by an electrical impulse of appropriate polarity; electrical counting means for maintaining a continuous algebraic count of electrical impulses received from said converter whereby a continuously available measurement of pressure applied to the transducer is maintained; means for recording the count upon command of the transducer; and means for sequentially connecting the electrical outputs of a plurality of pressure transducers to the recording means without disturbing the applied pressure.

2. The system for calibrating pressure transducers as in claim 1, further including means for identifying each command whenever it occurs.

3. The system for calibrating pressure transducers of the segmented potentiometer type including the elements of claim 2 wherein the identifying means comprises means responsive to a change in resistance at a boundary between segments of the potentiometer for generating an electrical impulse whose polarity is indicative of the sense of the causative pressure trend, means for algebraically counting the uninhibited electrical impulses, and means for recording the count coincidentally with recording the pressure.

References Cited in the file of this patent
UNITED STATES PATENTS 2,313,752 LeClair _____ Mar. 16, 1943
2,651,204 Dickinson _____ Sept. 8, 1953
2,715,331 Yates _____ Aug. 16, 1955

OTHER REFERENCES

Publication, "Automatic Calibration of Radiosonde Baroswitches" by Haynes, Electronics, volume 24, No. 5, May 1951, pages 126–129.